United States Patent
Vellimalai et al.

(10) Patent No.: US 9,811,282 B2
(45) Date of Patent: Nov. 7, 2017

(54) EFFICIENT REBUILD OF STORAGE DEVICES IN A REDUNDANT ARRAY OF INDEPENDENT DISKS (RAID)

(71) Applicant: DELL PRODUCTS L.P., Round Rock, TX (US)

(72) Inventors: Ashokan Vellimalai, Bangalore (IN); Deepu Syam Sreedhar M, Calicut (IN); Sandeep Agarwal, Bangalore (IN); Anup Atluri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 14/640,157

(22) Filed: Mar. 6, 2015

(65) Prior Publication Data

US 2016/0259588 A1  Sep. 8, 2016

(51) Int. Cl.
*G06F 3/06* (2006.01)
*G06F 11/00* (2006.01)

(52) U.S. Cl.
CPC .......... *G06F 3/0634* (2013.01); *G06F 3/0605* (2013.01); *G06F 3/0607* (2013.01); *G06F 3/0617* (2013.01); *G06F 3/0632* (2013.01); *G06F 3/0689* (2013.01); *G06F 11/00* (2013.01)

(58) Field of Classification Search
CPC .... G06F 3/0617; G06F 3/0619; G06F 3/0632; G06F 3/0689
See application file for complete search history.

(56) References Cited

U.S. PATENT DOCUMENTS

| | | | |
|---|---|---|---|
| 7,433,998 B2 | 10/2008 | Dawkins | 711/114 |
| 7,653,781 B2 | 1/2010 | Dawkins | 711/114 |
| 9,448,735 B1* | 9/2016 | Proulx | G06F 3/0632 |
| 2003/0236944 A1* | 12/2003 | Thompson | G06F 3/0605 |
| | | | 711/114 |
| 2010/0115331 A1* | 5/2010 | Perng | G06F 11/1092 |
| | | | 714/6.12 |
| 2014/0279849 A1* | 9/2014 | Zhang | G06F 17/30312 |
| | | | 707/609 |
| 2015/0309871 A1* | 10/2015 | Brauer | G06F 11/1076 |
| | | | 714/6.24 |

OTHER PUBLICATIONS

Yang et al., "A reliability optimization method for RAID-structured storage systems based on active data migration", Journal of Systems and Software, vol. 86, Issue 2, pp. 468-484, Feb. 2013.
Tian et al., "PRO: A Popularity-based Multi-threaded Reconstruction Optimization for RAID-Structured Storage Systems", 5th USENIX Conference on File and Storage Technologies, p. 301-314, Feb. 1, 2007.

* cited by examiner

*Primary Examiner* — Hal Schnee
(74) *Attorney, Agent, or Firm* — Baker Botts L.L.P.

(57) ABSTRACT

Methods and systems for efficient rebuild of storage devices in a RAID may include generating a data-modified map of a storage device. The data-modified map may be updated when a RAID virtual device associated with the storage device is degraded to indicate write operations. The data-modified map may be used to rebuild selective portions of the storage device, instead of performing a full rebuild. The data-modified map may also be used to perform a full rebuild of the storage device.

20 Claims, 5 Drawing Sheets

EFFICIENT REBUILD OF STORAGE DEVICES IN A REDUNDANT ARRAY OF INDEPENDENT DISKS (RAID)

BACKGROUND

Field of the Disclosure

This disclosure relates generally to information handling systems and more particularly to efficient rebuild of storage devices in a redundant array of independent disks (RAID).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, a RAID may be used to provide redundancy against faults or improved performance of physical storage devices used in a storage resource.

SUMMARY

In one aspect, a disclosed method for efficient rebuild of storage devices in a RAID includes detecting a storage device added to a RAID storage array controlled by a RAID controller. The method may include determining whether the storage device was previously used in the RAID storage array. When the storage device was previously used in the RAID storage array, the method may include identifying a data-modified map previously generated for the storage device, the data-modified map indicating modified portions of the storage device, and, based on the data-modified map, rebuilding the modified portions of the storage device.

In any of the disclosed embodiments, when the storage device was not previously used in the RAID storage array, the method may include generating the data-modified map for the storage device, and setting the data-modified map to indicate full rebuild of the storage device, such that all portions of the storage device are indicated as modified portions in the data-modified map. Based on the data-modified map, the method may include rebuilding the modified portions of the storage device.

Other disclosed aspects include a RAID controller comprising a non-transitory computer-readable medium storing instructions executable by a processor, and the information handling system comprising the RAID controller.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, certain information handling systems may include a RAID for redundancy against hardware faults or improved performance of a storage resource. The RAID may be configured in the form of RAID sets, or stripe sets, representing a virtual device (VD) that may span certain portions of multiple physical devices (PD), but that appears externally as a single volume. Because the RAID sets may be implemented with redundancy, a RAID may provide a certain level of protection against data loss, because information is duplicated and stored among different PDs. Various levels of RAID protection for performance and different levels of protections may be implemented.

As the capacity of storage devices has increased, data transfer rates in the PDs have not increased commensurately and error rates have not decreased commensurately. Therefore, larger capacity storage devices, such as 1 terabyte (TB) capacity or larger, may be particularly susceptible to hardware failures in PDs, such as unrecoverable read errors (URE). As the capacity of storage devices continues to increase, the likelihood of hardware failures in PDs in a RAID may actually continue to increase, because the observed and expected increases in mean time between failure (MTBF) do not keep pace with the increases in capacity of storage devices.

One impact of the error rate issue in a RAID involves rebuilding of storage devices. When a hardware failure, such as a URE, occurs, a RAID controller in a RAID may be able to rebuild the failed storage device and reconstruct the data so that no data is lost. However, with larger and larger storage devices having about the same data transfer rates, the time for rebuild of storage devices has increased significantly over time, and may continue to increase dramatically. Furthermore, with increased rebuild time and corresponding increase in access to the PD during rebuild, the probability of another hardware failure occurring during the rebuild have also increased. In some RAID systems, the rebuild time can be several hours or longer.

Further complications to the RAID rebuild issue may be related to operations that a typical RAID controller is designed to perform. For example, each instance of removal of a PD from a RAID, whether due to physical removal or other interruption, such as loss of electrical power or disconnection, may result in a total rebuild of the PD when reintroduced to the RAID, irrespective of whether any changes to the actual data stored on the PD have occurred. As a result of such typical RAID operation, some rebuilds may occur even when unnecessary, which is undesirable.

Another issue with RAID rebuilds may occur when an ongoing rebuild of a PD is interrupted. Because the rebuild may take a relatively long amount of time to complete, various unforeseen circumstances in the computing infrastructure associated with the RAID may occur during the rebuild, such as a system reboot, loss of electrical power, disconnection, etc. In a typical RAID, the rebuild will restart from the beginning when a previous rebuild was interrupted and did not complete, which is also undesirable.

As will be described in further detail herein, the inventors of the present disclosure have developed methods and systems for efficient rebuild of storage devices in a RAID that may selectively rebuild only certain portions of a storage device during a RAID rebuild. When the storage device is usable without rebuilding, the methods and systems disclosed herein may enable the storage device to be reintroduced in a RAID without a rebuild. When an ongoing RAID rebuild is interrupted, the methods and systems disclosed herein may enable the rebuild to restart (or resume) from a point of previous interruption. In this manner, the methods and systems disclosed herein for efficient rebuild of storage devices in a RAID may reduce rebuild times and improve efficiency and reliability of the RAID.

Particular embodiments are best understood by reference to FIGS. 1, 2, 3A, 3B, 4 and 5, wherein like numbers are used to indicate like and corresponding parts.

Figure 1:
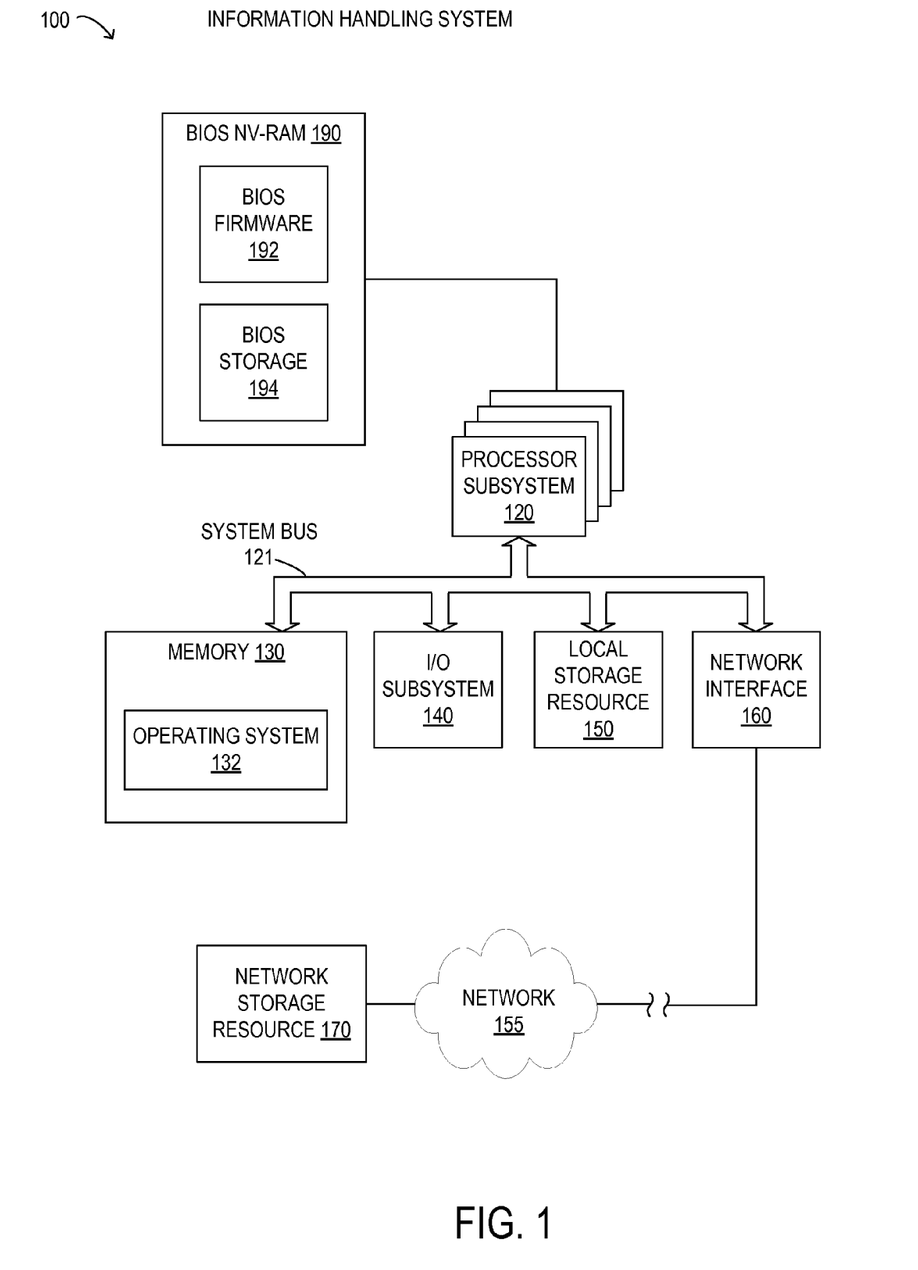
FIG. 1 is a block diagram of selected elements of an embodiment of an information handling system including a RAID for efficient rebuild of storage devices.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel may include circuitry for enabling touch functionality in conjunction with a display that is driven by display adapter.

Also shown in FIG. 1 is BIOS non-volatile random access memory (NV-RAM) 190, often simply or collectively referred to as the 'BIOS'. As shown, BIOS NV-RAM 190 may include BIOS firmware 192, representing pre-boot instructions executable by processor subsystem 120, for example, for preparing information handling system 100 to boot by activating various hardware components in preparation of launching operating system 132 for execution. BIOS firmware 192 may further include instructions for displaying a user interface (also referred to herein as a BIOS setup program) by which a user may access, modify, and store BIOS user settings. Also shown stored in BIOS NV-RAM 190 is BIOS storage 194, which may represent data, such as program code, settings, data values, etc. that BIOS firmware 192 may store. In certain embodiments, BIOS firmware 192 may have access to network interface 160 for various types of communication, such as with a network administrator. In certain embodiments, at least a portion of BIOS storage 194 may physically reside on a remote storage resource, such as in network storage resource 170.

In operation, information handling system 100 may have a RAID installed thereon. For example, local storage resource 150 or network storage resource 170 may include a RAID system, such as described in FIG. 2. The RAID system may be enabled for efficient rebuild of storage devices, as described herein.

Figure 2:
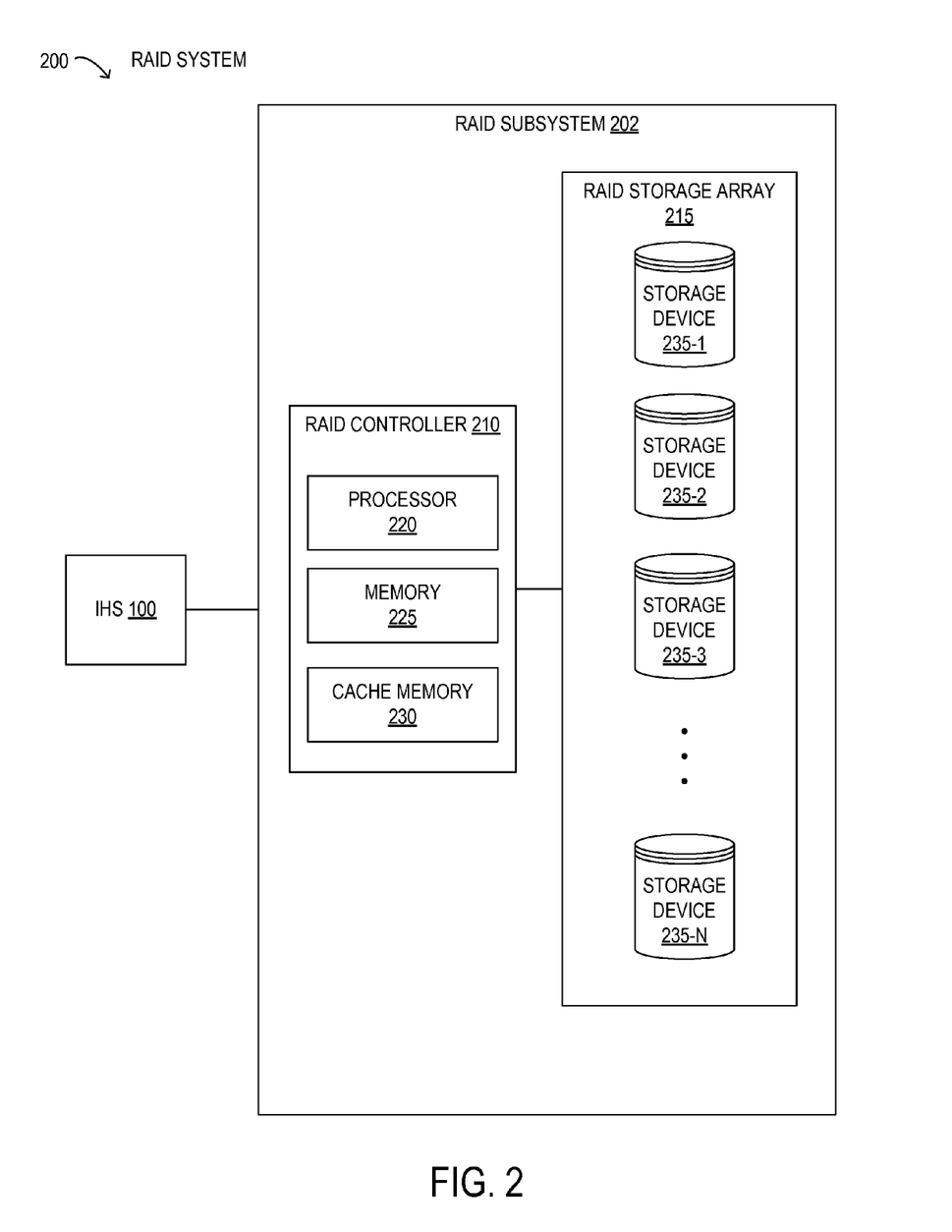
FIG. 2 is a block diagram of selected elements of an embodiment of a RAID system for efficient rebuild of storage devices.

Referring now to FIG. 2, selected elements of an embodiment of RAID system 200 are shown. RAID system 200 includes information handling system 100 (see FIG. 1) communicatively coupled to a RAID subsystem 202. RAID subsystem 202, in turn, includes a RAID controller 210 and a RAID storage array 215. RAID controller 210 includes a processor 220, main memory 225, and cache memory 230. RAID controller 210 is connected to RAID storage array 215 that includes a plurality of storage devices 235, shown as storage device 235-1, 235-2, 235-3, and so on, up to 235-N, where N is a desired number. In various embodiments, RAID subsystem 202 may be included with local storage resource 150 or network storage resource 170 described with respect to FIG. 1.

In RAID system 200, memory 225 may store firmware or other executable instructions for processor 220. Memory 225 may be similar to memory 130 described in FIG. 1. Cache memory 230 may be used to buffer I/O transfers during operation of RAID subsystem 202, such as when accessing RAID storage array 215. In various embodiments, RAID storage array 215 may be homogenous or inhomogeneous with respect to types of devices used for storage device 235. In certain embodiments, RAID storage array 215 includes storage devices 235 with Small Computer System Interface (SCSI) interfaces, Serial Attached SCSI (SAS) interfaces, Serial Advanced Technology Attachment (SATA) interfaces, or drives with other interfaces. RAID storage array 215 may include storage devices 235 different capacities, seek times, and transfer rates. Storage devices 235 may include magnetic hard drives, flash memory, solid state memory, or storage devices based on other technologies, or some combination thereof. Although a single instance of RAID storage array 215 is shown in FIG. 2 for descriptive clarity, it will be understood that, in different embodiments, RAID subsystem 20 or RAID controller 210 may be used with different numbers or instances of RAID storage array 215.

In operation of RAID system 200, RAID controller 210 may create one or more RAID sets, such as stripe sets, from one or more of storage devices 235, as desired. In some embodiments, the RAID sets implemented using RAID storage array 215 may include different RAID levels (such as levels 0, 1, 0+1, 5, etc.) or so-called just-a-bunch-of-disks (JBOD) sets. RAID controller 210 is enabled, for example using executable code or firmware, to read data from and write data to the RAID sets, which may represent virtual devices (VD) that are implemented on physical devices (PD) represented by storage devices 235.

Figure 3A:
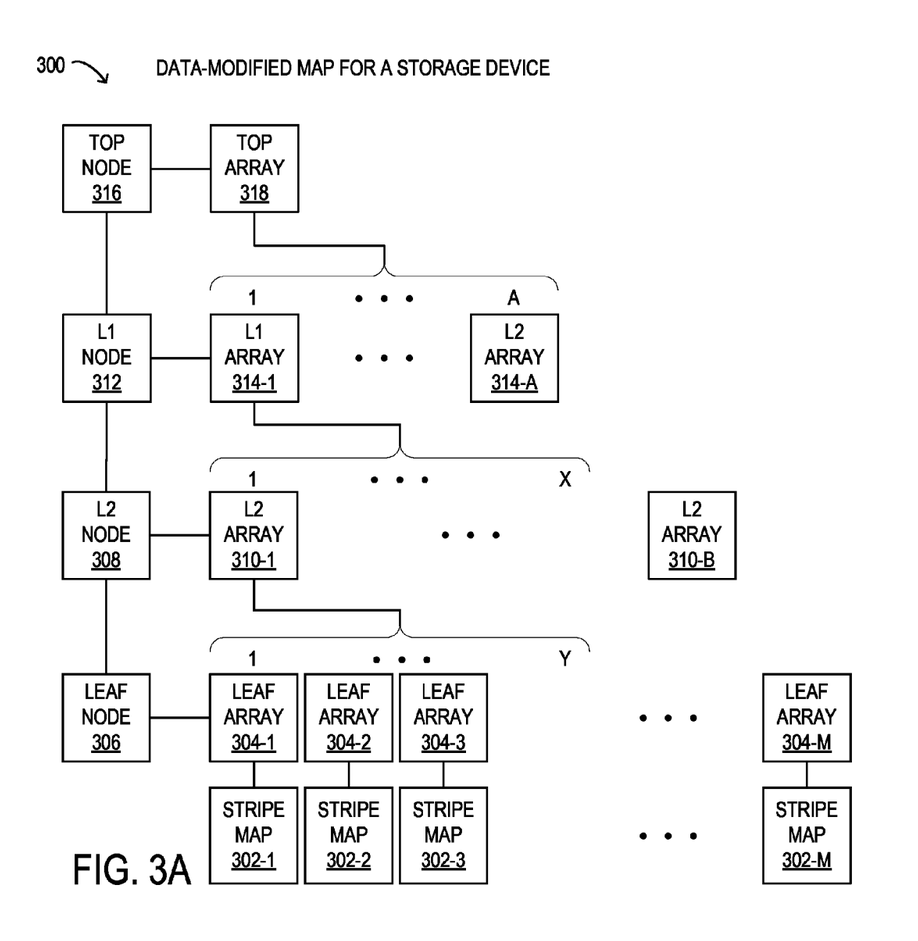
FIGS. 3A and 3B are selected elements of embodiments of a data-modified map for a storage device used in a RAID for efficient rebuild of storage devices.
Figure 3B:
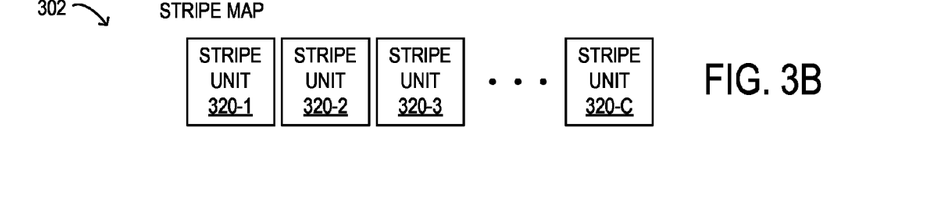

In particular embodiments, RAID controller 210 may generate and maintain a data-modified map (see FIG. 3) for RAID sets in storage device 235. RAID controller 210 may generate the data-modified map when the storage device is added. For example, the data-modified map may be stored with (or as) metadata associated with storage device 235. When a VD (or a logical volume) controlled by RAID controller 210 becomes degraded, such that at least some RAID sets stored in storage device 235 become inaccessible (such as when storage device 235 is removed), RAID controller 210 may begin tracking which portions of the storage device have been modified by subsequent write operations by modifying or updating the data-modified map for storage device 235 accordingly. When storage device 235 again appears and is detected by RAID controller 210 in RAID storage array 215, RAID controller 210 may identify the previously generated (and updated in the meantime) data-modified map for storage device 235. It is noted that storage device 235 may be identified by RAID controller 210 based on a hardware identifier or another identifier, such as a logical identifier. Then, RAID controller 210 may rebuild the modified portions of the storage device, including rebuilding certain RAID sets, as indicated by the data-modified map. When a new storage device 235 is identified, a new data-modified map may be generated and set to indicate full rebuild, such that the same procedure for rebuilding the storage device, based on the data-modified map, may be used in different situations involving rebuild in RAID system 200.

Referring now to FIG. 3A, selected elements of an embodiment of data-modified map 300 are shown. Using data-modified map 300, a description of data stored in a storage device, such as storage device 235, may be generated and maintained, for example by RAID controller 210.

In data-modified map 300, a lowest hierarchical level, referred to as a leaf level, may include stripe maps 302 and leaf array 304, as well as leaf node 306, which may be a data structure pointing to leaf array 304. Stripe maps 302 may provide a mapping of stripe units 320 (see FIG. 3B) that comprise a RAID set (or a stripe set) used with RAID system 200. For example, in a given RAID configuration, a fixed number C of stripe units 320 for each stripe map 302 (corresponding to a number C of stripe sets per storage device, for example) may be defined, such as C=64. Stripe maps 302 may correspond to the stripe sets used to implement various types of RAID configurations. Leaf array 304 may include single bit elements corresponding to a particular stripe map 302. As shown, data-modified map 300 includes leaf array element 304-1 corresponding to stripe map 302-1, leaf array element 304-2 corresponding to stripe map 302-2, leaf array element 304-3 corresponding to stripe map 302-3, and so on, up to leaf array element 304-M corresponding to stripe map 302-M. Given an overall capacity S of the storage device, a size U of each stripe unit 320, as well as C number of stripe sets per storage device, the value M may be calculated as M=S/(U*C). Accordingly, the bit in each element of leaf array 304 may indicate whether data in corresponding stripe map 302 has been modified or not.

In data-modified map 300, higher hierarchical levels, referred to as upper levels, may include a level node and a level array, such that each element (or bit) in the level array describes a group of elements in a next-lower hierarchical level. In FIG. 3, level 2 (L2) array 310 may describe leaf array 304. Specifically, first L2 array element 310-1 may describe leaf array 304 elements 1 to Y, while each subsequent element in L2 array 310 describes a subsequent Y number of elements in leaf array 304. In this manner, L2 array 310 may represent a bit mask, where each bit corresponds to an element in leaf array 304. As shown, L2 array 310 may have B number of elements, where B is given by B=M/Y. L2 node 308 may be a data structure pointing to L2 array 310. Correspondingly, level 1 (L1) array 314 may describe L2 array 310 in a similar manner, where first element L1 array 314-1 describes L2 array elements 1 to X, such that L1 array 314 may represent a bit mask, where each bit corresponds to an element in L2 array 310. As shown, L1 array 314 may have A number of elements, where A is given by A=B/X. L1 node 312 may be a data structure pointing to L1 array 314. Because each higher level array condenses information from lower levels, it may be generally stated that 1<A<B<M in exemplary data-modified map 300. Finally, top array 318 is a single element array comprising a single bit that indicates whether the storage device has been modified, based on aggregate information in data-modified map 300. Top node 316 may be a data structure pointing to top array 318. It is noted that top node 316, L1 node 312, L2 node 308, and leaf node 306 may be linked to each other and may be used to navigate data-modified map 300, for example using executable code. Although 2 upper levels are shown in FIG. 3 for descriptive clarity, it will be understood that data-modified map 300 may be implemented with different numbers of upper levels, and for desired values of A, B, C, M, U, X, and Y, such as for different types and sizes of storage devices. The values A, B, C, M, U, X, and Y may be expressed in sectors, which may correspond to a given number of bytes, such as 512 or 4096 bytes.

Referring now to FIG. 3B, selected elements of an embodiment of stripe map 302 are shown. Stripe map 302 may include an array of stripe units 320, which may each have a uniform size U. As shown, stripe map 302 includes stripe unit 320-1, stripe unit 320-2, stripe unit 320-3, and so on, up to stripe unit 320-C, where C is the number of stripe units in the storage device in a particular RAID configuration.

Figure 4:
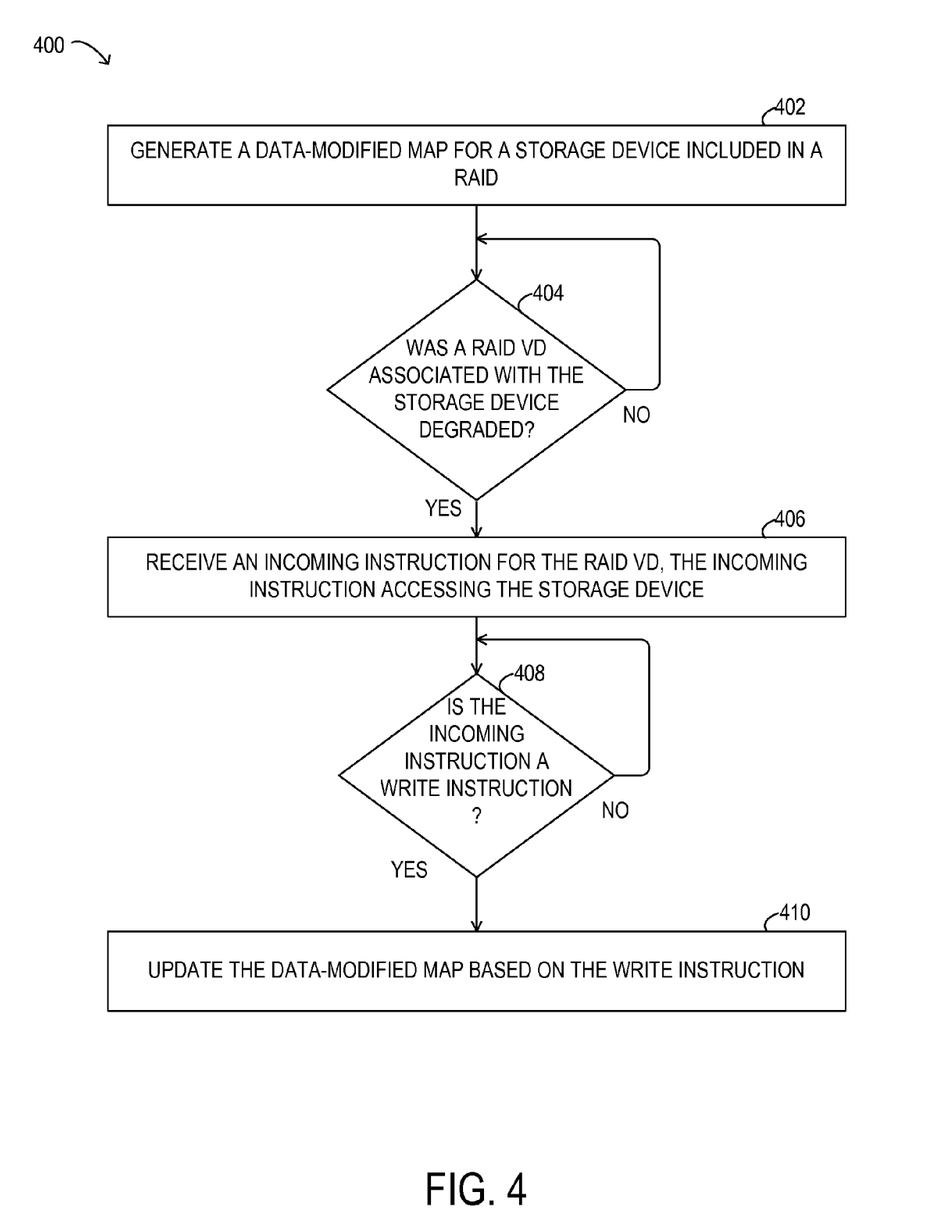
FIG. 4 is a flowchart depicting selected elements of an embodiment of a method for efficient rebuild of storage devices in a RAID.

Referring now to FIG. 4, a block diagram of selected elements of an embodiment of method 400 for efficient rebuild of a storage device in a RAID, as described herein, is depicted in flowchart form. Method 400 may be performed using RAID controller 210 (see FIG. 2). In particular embodiments, method 400 is performed by processor 220 executing instructions stored in memory 225. For example, RAID controller 210 may perform method 400 for each storage device 235 included with RAID subsystem 202. The instructions may represent firmware for RAID subsystem 202. It is noted that certain operations described in method 400 may be optional or may be rearranged in different embodiments.

Method 400 begins by generating (operation 302) a data-modified map for a storage device included in a RAID. Then, a determination is made whether a RAID virtual device associated with the storage devices was degraded (operation 404). The RAID virtual device may correspond to a particular stripe set, comprising a plurality of respective stripe units, such as M number of stripe units 320-1 for each of M stripe maps 302 (see FIG. 3). The RAID virtual device may span multiple storage devices. When the result of operation 404 is NO, method 400 loops back to operation 404, representing a polling operation until the result of operation 404 is YES. When the result of operation 404 is YES, an incoming instruction is received for the RAID virtual device, the incoming instruction accessing the storage device. Then, a determination is made whether the incoming instruction is a write instruction (operation 408). When the result of operation 408 is NO, method 400 loops back to operation 408, representing a polling operation until the result of operation 408 is YES. When the result of operation 408 is YES, the data-modified map is updated (operation 410) based on the write instruction.

Figure 5:
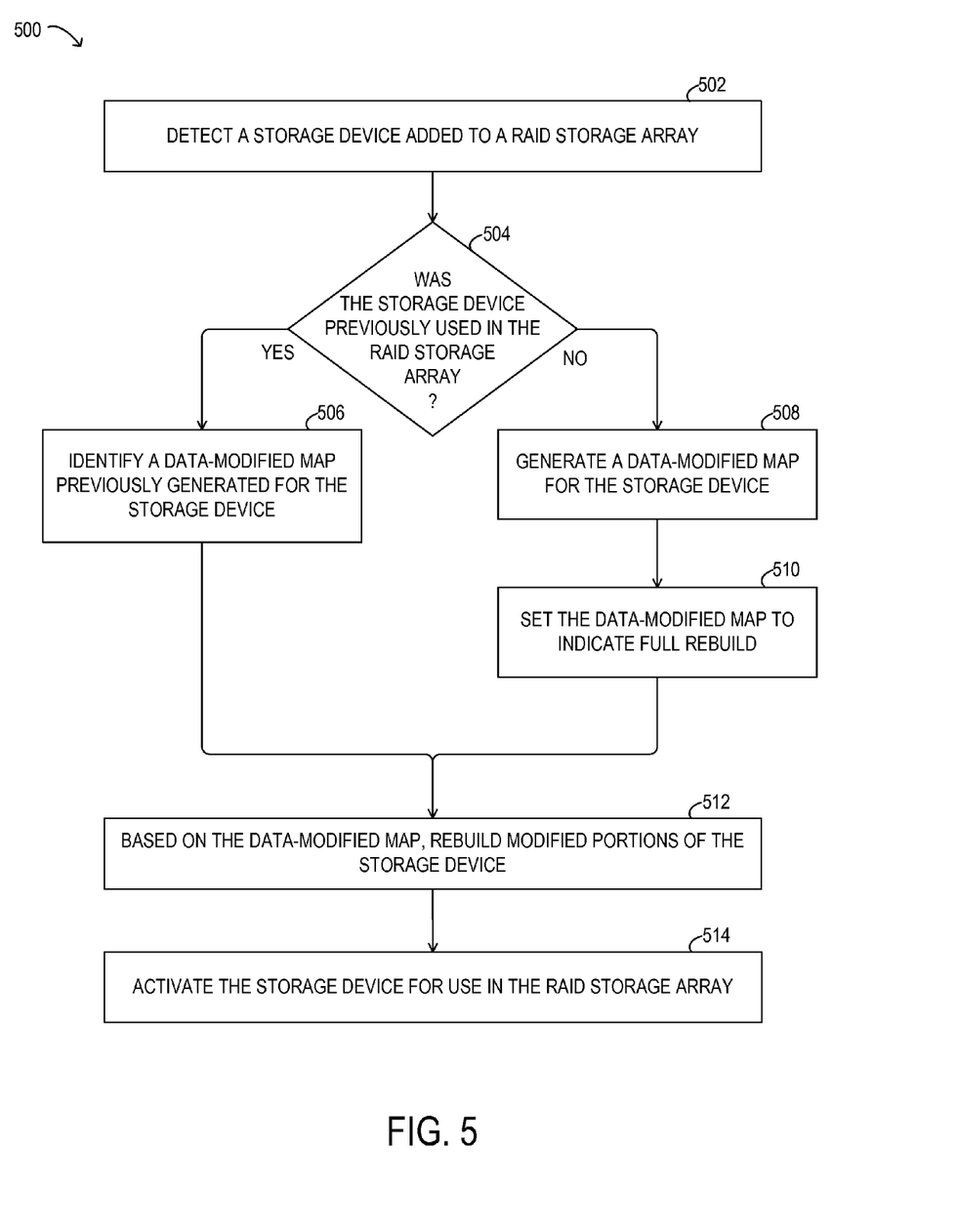
FIG. 5 is a flowchart depicting selected elements of an embodiment of a method for efficient rebuild of storage devices in a RAID.

Referring now to FIG. 5, a block diagram of selected elements of an embodiment of method 500 for efficient rebuild of a storage device in a RAID, as described herein, is depicted in flowchart form. Method 500 may be performed using RAID controller 210 (see FIG. 2). In particular embodiments, method 500 is performed by processor 220 executing instructions stored in memory 225. For example, RAID controller 210 may perform method 500 for each storage device 235 included with RAID subsystem 202. The instructions may represent firmware for RAID subsystem 202. It is noted that certain operations described in method 500 may be optional or may be rearranged in different embodiments.

Method 500 begins by detecting (operation 502) a storage device added to a RAID storage array. Then, a determination is made whether the storage device was previously used in the RAID storage array (operation 504). When the result of operation 504 is YES, a data-modified map previously generated for the storage device is identified (operation 506). When the result of operation 504 is NO, a data-modified map for the storage device is generated (operation 508) and the data-modified may is set to indicate full rebuild (operation 510). The data modified may be set to full rebuild by setting all values in arrays to 1, effectively marking all portions of the storage device for rebuild. After operation 506 or after operation 510, based on the data-modified map, modified portions of the storage device may be rebuilt (operation 512). The storage device may be activated (operation 514) for use in the RAID storage array.

Disclosed methods and systems for efficient rebuild of storage devices in a RAID may include generating a data-modified map of a storage device. The data-modified map may be updated when a RAID virtual device associated with the storage device is degraded to indicate write operations. The data-modified map may be used to rebuild selective portions of the storage device, instead of performing a full rebuild. The data-modified map may also be used to perform a full rebuild of the storage device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   detecting a storage device added to a redundant array of independent disks (RAID) storage array controlled by a RAID controller;
   determining whether the storage device was previously used in the RAID storage array;
   determining, dependent on a data-modified map indicating modified portions of the storage device, whether to perform a rebuild of only selective portions of the storage device or a full rebuild of the storage device, wherein values of elements of the data-modified map are dependent on whether the storage device was previously used in the RAID storage array; and
   performing the determined rebuild.

2. The method of claim 1, wherein:
   the method further comprises:
      when the storage device was not previously used in the RAID storage array:
         generating the data-modified map for the storage device; and
         setting values of elements of the data-modified map to indicate full rebuild of the storage device; and
   determining whether to perform a rebuild of only selective portions of the storage device or a full rebuild of the storage device comprises:
      determining, based on the data-modified map, that a full rebuild of the storage device is to be performed.

3. The method of claim 2, wherein generating the data-modified map includes:
   generating a plurality of stripe maps respectively associated with RAID stripe sets used in the storage device, wherein each of the stripe maps includes a plurality of stripe units corresponding in number to a number of the RAID stripe sets;
   generating a leaf array corresponding to the plurality of stripe maps, wherein each element in the leaf array indicates a change in a respective stripe map;
   generating a first upper level array corresponding to at least some elements in a lower level array selected from the leaf array, wherein each element in the first upper level array indicates a change in elements of the lower level array;
   generating a second upper level array; and
   generating a top level array having one element, the element in the top level array indicating a change in the storage device.

4. The method of claim 2, further comprising:
   activating the storage device in the RAID storage array; and
   after the activating of the storage device in the RAID storage array:
      determining whether a RAID virtual device associated with the storage device was degraded, wherein a degraded RAID virtual device does not have access to at least one RAID stripe set; and
      when the RAID virtual device is degraded, updating the data-modified map in response to receiving a write instruction for the RAID virtual device, wherein the data-modified map is updated based on the write instruction.

5. The method of claim 1, wherein the storage device is selected from a rotating-media storage device and a solid state storage device.

6. The method of claim 1, wherein the identifying the data-modified map includes identifying the data-modified map in a memory accessible to the RAID controller.

7. The method of claim 1, wherein the RAID controller controls a plurality of storage devices, including the storage device, and further comprising:
   generating a plurality of data-modified maps respectively corresponding to the plurality of storage devices.

8. The method of claim 1, wherein:
   the method further comprises, when the storage device was previously used in the RAID storage array:
      identifying the data-modified map as previously generated for the storage device; and determining whether to perform a rebuild of only selective portions of the storage device or a full rebuild of the storage device comprises:
determining, based on the data-modified map, that a rebuild of only the modified portions of the storage device is to be performed.

9. An information handling system, comprising a redundant array of independent disks (RAID) controller, the RAID controller further comprising:
a non-transitory computer-readable medium storing instructions that, when executed by a processor, cause the processor to:
detect a storage device added to a RAID storage array controlled by the RAID controller;
determine whether the storage device was previously used in the RAID storage array;
when the storage device was previously used in the RAID storage array, identify a data-modified map previously generated for the storage device, the data-modified map indicating modified portions of the storage device; and
when the storage device was not previously used in the RAID storage array:
generate the data-modified map for the storage device; and
set the data-modified map to indicate full rebuild of the storage device, wherein all portions of the storage device are indicated as modified portions in the data-modified map; and
based on the data-modified map, rebuild the modified portions of the storage device.

10. The information handling system of claim 9, wherein the instructions to generate the data-modified map include instructions to:
generate a plurality of stripe maps respectively associated with RAID stripe sets used in the storage device, wherein each of the stripe maps includes a plurality of stripe units corresponding in number to a number of the RAID stripe sets;
generate a leaf array corresponding to the plurality of stripe maps, wherein each element in the leaf array indicates a change in a respective stripe map;
generate a first upper level array corresponding to at least some elements in a lower level array selected from the leaf array, wherein each element in the first upper level array indicates a change in elements of the lower level array;
generate a second upper level array; and
generate a top level array having one element, the element in the top level array indicating a change in the storage device.

11. The information handling system of claim 9, further comprising instructions to:
activate the storage device in the RAID storage array; and
after activation of the storage device in the RAID storage array:
determine whether a RAID virtual device associated with the storage device was degraded, wherein a degraded RAID virtual device does not have access to at least one RAID stripe set; and
when the RAID virtual device is degraded, update the data-modified map in response to receiving a write instruction for the RAID virtual device, wherein the data-modified map is updated based on the write instruction.

12. The information handling system of claim 9, wherein the storage device is selected from a rotating-media storage device and a solid state storage device.

13. The information handling system of claim 9, wherein the instructions to identify the data-modified map include instructions to identify the data-modified map in a memory accessible to the RAID controller.

14. The information handling system of claim 9, wherein the RAID controller controls a plurality of storage devices, including the storage device, and further comprising instructions to:
generate a plurality of data-modified maps respectively corresponding to the plurality of storage devices.

15. A redundant array of independent disks (RAID) controller comprising:
a non-transitory computer-readable medium storing instructions that, when executed by a processor, cause the processor to:
detect a storage device added to a RAID storage array controlled by the RAID controller;
determine whether the storage device was previously used in the RAID storage array;
when the storage device was previously used in the RAID storage array:
identify a data-modified map previously generated for the storage device, the data-modified map indicating modified portions of the storage device;
when the storage device was not previously used in the RAID storage array:
generate the data-modified map for the storage device;
set the data-modified map to indicate full rebuild of the storage device, wherein all portions of the storage device are indicated as modified portions in the data-modified map; and
based on the data-modified map, rebuild the modified portions of the storage device.

16. The RAID controller of claim 15, wherein the instructions to generate the data-modified map include instructions to:
generate a plurality of stripe maps respectively associated with RAID stripe sets used in the storage device, wherein each of the stripe maps includes a plurality of stripe units corresponding in number to a number of the RAID stripe sets;
generate a leaf array corresponding to the plurality of stripe maps, wherein each element in the leaf array indicates a change in a respective stripe map;
generate a first upper level array corresponding to at least some elements in a lower level array selected from the leaf array, wherein each element in the first upper level array indicates a change in elements of the lower level array;
generate a second upper level array; and
generate a top level array having one element, the element in the top level array indicating a change in the storage device.

17. The RAID controller of claim 15, further comprising instructions to:
activate the storage device in the RAID storage array; and
after activation of the storage device in the RAID storage array:
determine whether a RAID virtual device associated with the storage device was degraded, wherein a degraded RAID virtual device does not have access to at least one RAID stripe set; and when the RAID virtual device is degraded, update the data-modified map in response to receiving a write instruction for the RAID virtual device, wherein the data-modified map is updated based on the write instruction.

18. The RAID controller of claim 15, wherein the storage device is selected from a rotating-media storage device and a solid state storage device.

19. The RAID controller of claim 15, wherein the instructions to identify the data-modified map include instructions to identify the data-modified map in a memory accessible to the RAID controller.

20. The RAID controller of claim 15, wherein the RAID controller controls a plurality of storage devices, including the storage device, and further comprising instructions to:
   generate a plurality of data-modified maps respectively corresponding to the plurality of storage devices.

* * * * *